United States Patent [19]

Harada et al.

[11] Patent Number: 5,363,003
[45] Date of Patent: Nov. 8, 1994

[54] MOTOR AND CIRCUITRY FOR PROTECTING SAME

[75] Inventors: Koji Harada; Takashi Hirata, both of Shiga; Fumihiro Morikawa; Shuji Takahashi, both of Yonago, all of Japan

[73] Assignee: Nippon Densan Corporation, Kyoto, Japan

[21] Appl. No.: 891,717

[22] Filed: Jun. 1, 1992

[30] Foreign Application Priority Data

Jun. 6, 1991 [JP] Japan .................. 3-160820
Jun. 28, 1991 [JP] Japan .................. 3-185351
Dec. 13, 1991 [JP] Japan .................. 3-352463

[51] Int. Cl.$^5$ ................ H02K 7/14; H02K 11/00; H02K 5/00; H02K 1/06
[52] U.S. Cl. ................ 310/67 R; 310/91; 310/217
[58] Field of Search .......... 310/62, 63, 67 R, 91, 310/217, 42, 90

[56] References Cited

U.S. PATENT DOCUMENTS

| | | | |
|---|---|---|---|
| 3,919,572 | 11/1975 | Desy | 310/67 R |
| 4,130,770 | 12/1978 | Wrobel | 310/67 R |
| 4,617,484 | 10/1986 | Buijsen | 310/67 R |
| 4,682,065 | 7/1987 | English et al. | 310/67 R |
| 4,703,209 | 10/1987 | Wrobel | 310/67 R |
| 4,737,673 | 4/1988 | Wrobel | 310/67 R |
| 4,934,041 | 6/1990 | Hoover et al. | 310/91 |
| 4,955,791 | 9/1990 | Wrobel | 310/67 R |
| 5,013,957 | 5/1991 | Wrobel | 310/217 |

FOREIGN PATENT DOCUMENTS

| | | | |
|---|---|---|---|
| 0254951 | 10/1990 | Japan | 310/91 |
| 0112334 | 5/1991 | Japan | 310/91 |

*Primary Examiner*—Steven L. Stephan
*Assistant Examiner*—C. LaBalle
*Attorney, Agent, or Firm*—McCormick, Paulding & Huber

[57] ABSTRACT

A motor is provided which includes a housing, a stator attached to the cylindrical wall of the housing, a sleeve bearing attached to the inner periphery of the cylindrical wall, a rotor rotatably supported by the sleeve bearing, and a rotor magnet attached to the rotor. A plurality of projecting strips are formed substantially at equal intervals on the inner and/or outer periphery of the cylindrical wall of the housing. The cylindrical wall is formed into a shoulder and a mating recess. The stator has elastic pieces. Because of the operation of the elastic pieces, the stator is elastically retained between the shoulder and the mating recess. Circuitry for protecting the motor is improved.

7 Claims, 9 Drawing Sheets

MOTOR AND CIRCUITRY FOR PROTECTING SAME

FIELD OF THE INVENTION

The present invention relates to a motor, such as a fan motor for cooling purposes, and circuitry for protecting the same.

DESCRIPTION OF THE RELATED ART

In general, motors, such as fan motors, have housings made of synthetic resin and rotors rotatable relative to the housings. A plurality of vanes are formed at intervals on the outer peripheries of the rotors. The housings have cylindrical walls. The shafts of the rotors are rotatably supported by the cylindrical walls with the aid of sleeve bearings. Stators are attached to the outer peripheries of the cylindrical walls. Rotor magnets are attached to the rotors so as to face the stators.

In such a fan motor, when the stator is attached to the outer periphery of the cylindrical wall, inward pressure is exerted first on the cylindrical wall and then on the sleeve bearing. Also, when the sleeve bearing is attached to the cylindrical wall, inward pressure is exerted from the cylindrical wall to the sleeve bearing. The two types of pressure distort the sleeve bearing to some extent. If the amount of such a distortion increases further, the bearing of the rotor vibrates, thus causing noise and vibration and decreasing the life of the motor.

In this type of fan motor, the stator is fixed by either pressure or an adhesive to the cylindrical wall of the housing. When fixed by pressure, the cylindrical wall is likely to deform. If it does, it is difficult to reliably support the shaft of the rotor with the aid of the bearing. This creates noise and vibration. Also, the operation of fixing the stator by the adhesive is troublesome, and is not suitable for automatic assembly using automatic machinery.

Furthermore, in such a fan motor, when the rotor is locked, that is, when it is stopped for some reason despite a driving electric current flowing, an over-current, approximately three times as great as an electric current for ordinary rotation, flows to the driving coil of the stator. The coil is thus heated excessively, and if it is heated beyond an allowable range, the motor may generate smoke and fail.

SUMMARY OF THE INVENTION

A first object of the present invention is to provide a motor in which the amount a sleeve bearing deforms is reduced during motor assembly.

A second object of this invention is to provide a motor suitable for automatic assembly in which a stator can be readily attached to the cylindrical wall of a housing.

A third object is to provide circuitry for protecting a motor, which is capable of reliably stopping the flow of an electric current to a driving coil when a rotor is locked, and which prevents the coil from being heated.

Other objects, features and advantages of this invention will become more fully apparent from the following detailed description of the preferred embodiments.

DETAILED DESCRIPTION OF THE PREFERRED EMBODIMENTS

The preferred embodiments will be described below in detail with reference to the accompanying drawings.

First Embodiment of Fan Motor

Referring to FIGS. 1 through 10, a description will be given of a first embodiment of a motor, such as a fan motor, according to the present invention.

Figure 1:
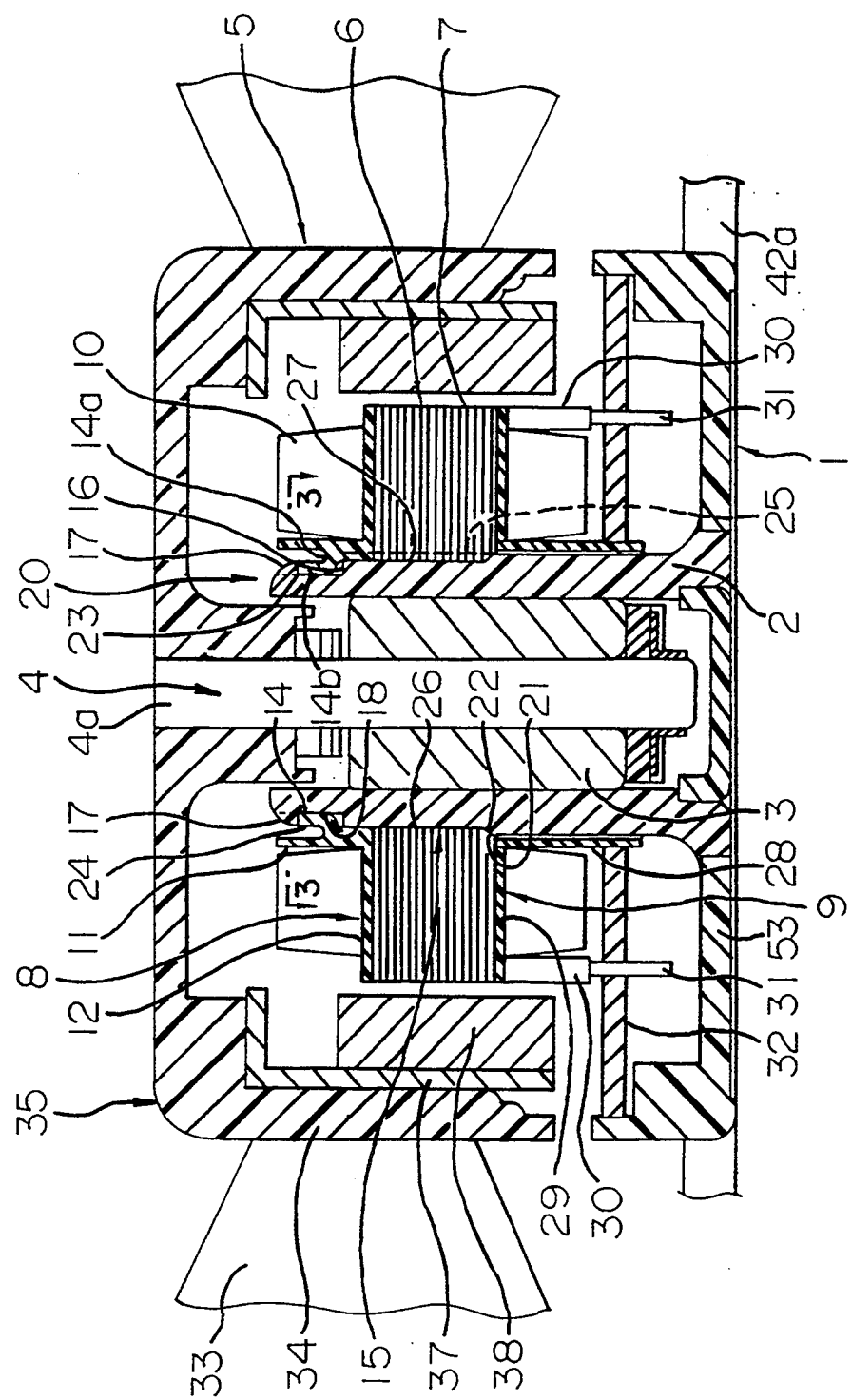
FIG. 1 is a sectional view showing a first embodiment of a motor, such as a fan motor, in accordance with this invention.
Figure 6:
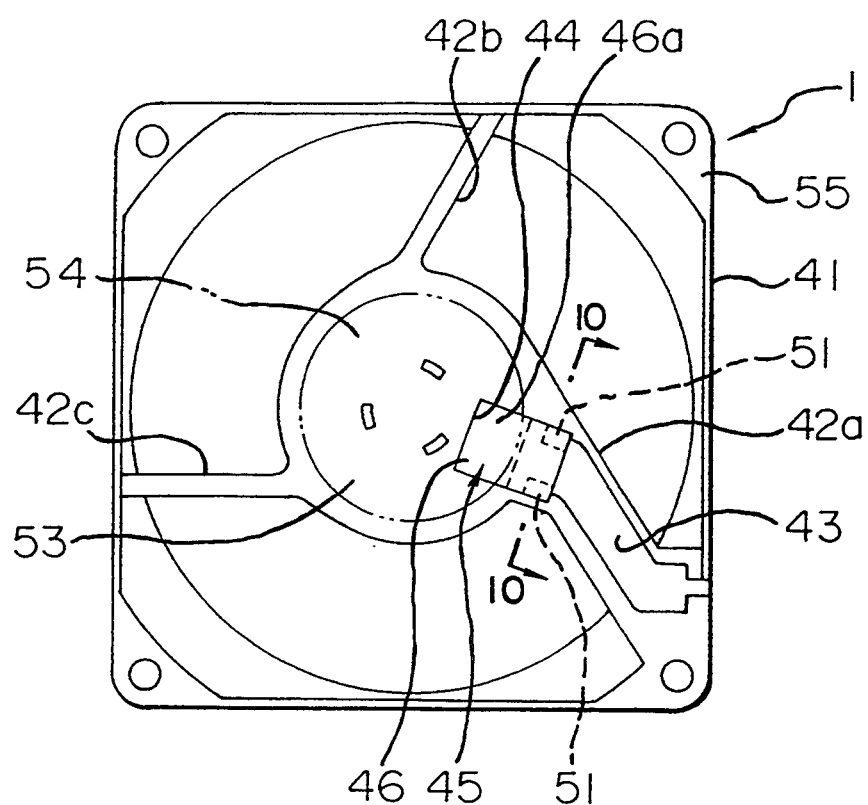
FIG. 6 is a rear view of the fan motor shown in FIG. 1.

As shown in FIGS. 1 and 6, the fan motor has a rectangular housing 1. A disk-like motor body 53 is provided at the center of the housing 1. Three connecting portions 42a, 42b and 42c are interposed between the motor body 53 and a rectangular frame 55. A cylindrical wall 2, which may be integrally formed with the motor body 53, is attached to the latter component. One end of the wall 2 is secured to the motor body 53. In this embodiment, the housing 1 or the frame 55, the cylindrical wall 2, the connecting portions 42a, 42b and 42c, and the motor body 53 are made of synthetic resin.

A sleeve bearing 3 containing a lubricating oil is attached to the inner periphery of the cylindrical wall 2. A bearing member 4 is rotatably supported with the aid of the sleeve bearing 3. A rotor 5 is secured to one end of the bearing member 4, and has a cuplike rotor body 35. A plurality of vanes 33 are formed ale intervals on a peripheral wall 34 of the rotor body 35. The bearing member 4 may be integrally formed with the rotor 5.

Figure 2:
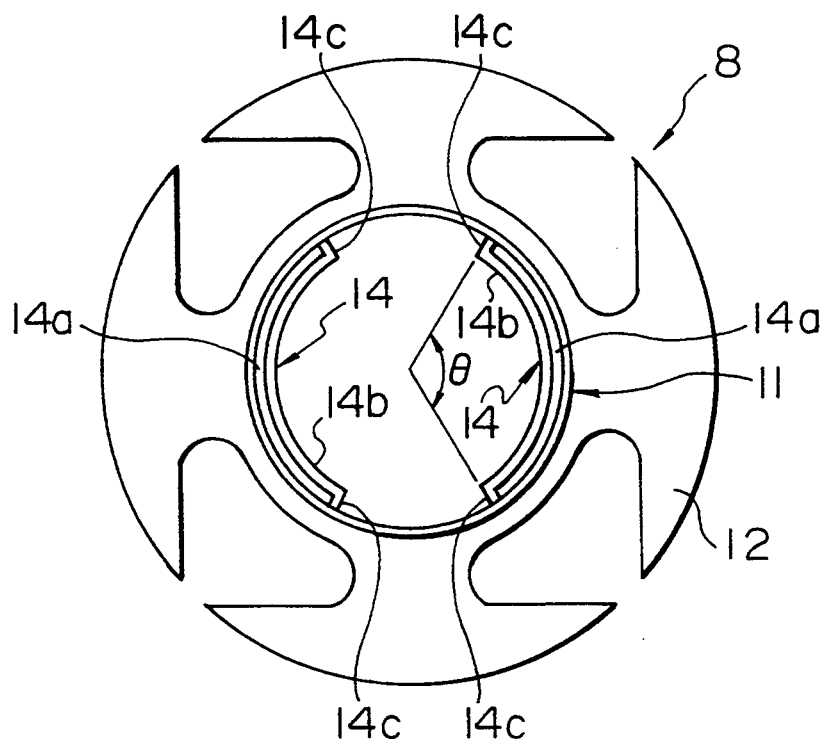
FIG. 2 is a plan view showing the stator of the fan motor illustrated in FIG. 1.
Figure 3:
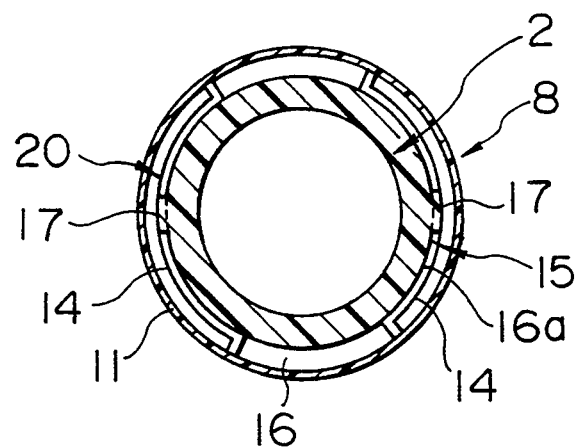
FIG. 3 is an end view taken along line X—X of FIG. 1.

A stator 6 is attached to the outer periphery of the cylindrical wall 2, and has a stator core 7 which is composed of laminated core plates. Insulators 8 and 9, which may be formed of synthetic resin, are disposed on both ends of the stator core 7. Referring to FIGS. 2 and 3, the insulator 8 on one (upper) end of the stator core 7 has an insulator body 12, the shape of which corresponds to the shape of the core plates. A cylinder 11 projecting upwardly is formed on the inner periphery of the insulator body 12. Two elastic pieces 14 are integrally formed with the cylinder 11, and project inwardly and radially. The two elastic pieces 14 are formed symmetrically. Each elastic piece 14 is composed of a bottom 14a, an arc-like retaining portion 14b and two connecting portions 14c. The bottom 14a extends inwardly and radially from the cylinder 11, whereas the arc-like retaining portion 14b extends upwardly from the inner side of the bottom 14a. The connecting portions 14c connect the cylinder 11 to both ends of the retaining portion 14b. An angle $\theta$ formed between the connecting portions 14c is set at approximately 120°.

A mating recess is formed in the outer periphery of the free end of the cylindrical wall 2 of the housing 1. In this embodiment, a step portion 16 is formed in the outer periphery of the cylindrical wall 2. A pair of projections 17 are formed on the portion of the step portion 16 where it has a small diameter. The step portion 16 and the projections 17 constitute the mating recess. Although two projections 17 are formed at intervals on the inner periphery of the cylindrical wall 2, three or more projections may also be formed. The elastic pieces 14 of the insulator 8 engage with the mating recess, as described later.

The insulator 9 on the other (lower) end of the stator core 7 has an insulator body 29 and a cylinder 28 extending downwardly from the inner periphery of the insulator body 29. A circuit substrate 32 is disposed outside the cylinder 28. The insulator body 29 has descending portions 30 extending downwardly. Connecting pins 31 are embedded in the descending portions 30. An armature coil 10 is wound around the stator 6 covered with the insulators 8 and 9. Lead wires extend from the coil 10 and are linked to the connecting pins 31, from which they are electrically linked to the circuit pattern of the circuit substrate 32.

A shoulder 21 is formed at the center of the height of the cylindrical wall 2 of the housing 1. In this embodiment, the shoulder 21 is tapered in the area where the stator 6 is attached from above, that is, it widens toward the lower sides of FIGS. 1, 4 and 5. The lower, inner periphery of the stator core 7 is also tapered so as to correspond to the shape of the shoulder 21. As shown FIG. 4, it is desirable that the tapered angle $\theta_1$ of the shoulder 21 be greater than the tapered angle $\theta_2$ of the stator core 7. Because of the above structure, the tapered portion of the stator core 7 reliably comes into contact with the shoulder 21 of tube cylindrical wall 2, as described later. Thus, the stator 6 is reliably attached to the cylindrical wall 2.

A projecting strip 25 for preventing rotation is formed on the outer periphery of the cylindrical wall 2 of the housing 1. It extends in the direction in which the stator 6 is attached, that is, in the axial direction of the cylindrical wall 2. As shown in FIG. 1, the projecting strip 25 extends from the step portion 16 to the shoulder 21. A groove 27 is formed in the inner periphery of the stator core 7, and extends in the axial direction of the cylindrical wall 2. When the stator 6 is attached, the projecting strip 25 engages with the groove 27, thereby reliably preventing the stator 6 from rotating relative to the cylindrical wall 2.

An annular yoke 37 is attached to the inner periphery of the peripheral wall 34 of the rotor 5. A rotor magnet 38 facing the stator 6 is attached to the inner periphery of the yoke 37 and positioned outside the stator 6. Because of the operation of the stator 6 and the rotor magnet 38, the rotor 5 is rotated in a predetermined direction with respect to the housing 1.

Figure 4:
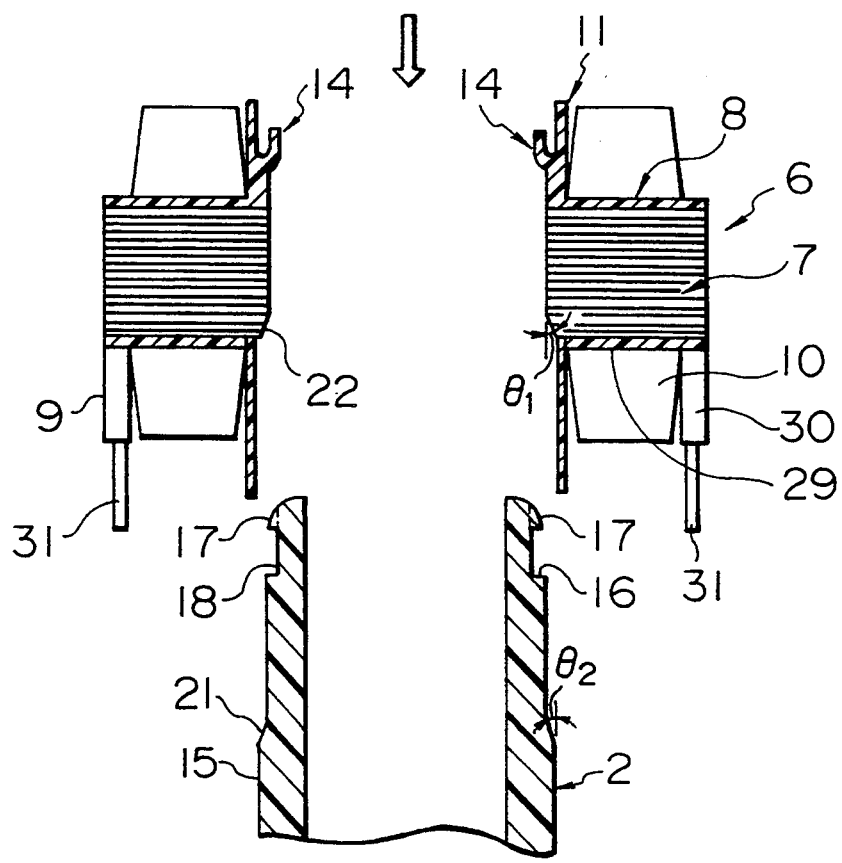
FIGS. 4 and 5 are each fragmentary end views illustrating the method of attaching the stator of the fan motor shown in FIG. 1.
Figure 5:
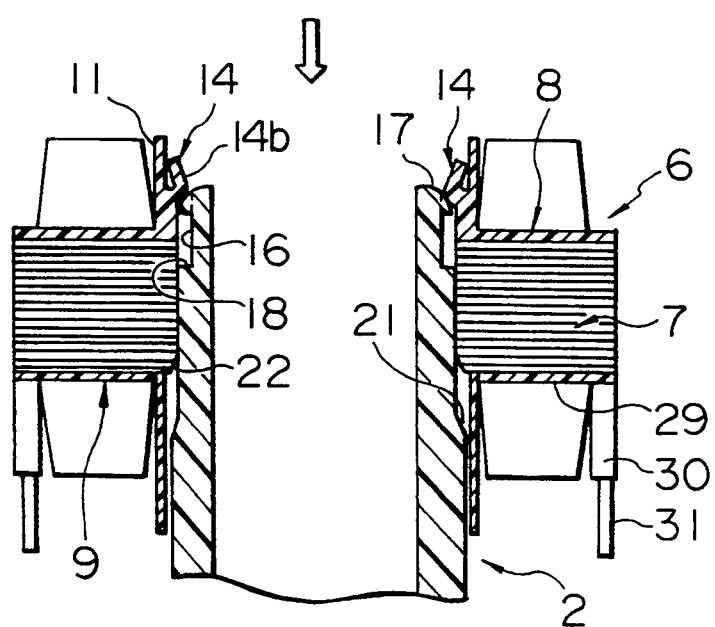

The method of attaching the stator 6 will now be described with reference to FIGS. 1, 4 and 5.

The stator 6 is first positioned near the free end of the cylindrical wall 2 of the housing 1, and is then moved downwardly as indicated by the arrow so that it can be attached to the outer periphery of the cylindrical wall 2. When the stator 6 is further moved downwardly, as shown in FIG. 5, the elastic pieces 14 of the insulator 8 are slightly deformed by the projections 17 of the cylindrical wall 2. When it is moved downwardly further, the elastic pieces 14 slide over the projections 17 and move into the mating recess, whereby these pieces engage with this recess.

As is apparent from FIG. 1, the tapered portion of the stator core 7 comes into contact with the shoulder 21 of the cylindrical wall 2. At the same time, the free ends of the elastic pieces 14 of the insulator 8 act on the projections 17 of the cylindrical wall 2. Because of the resilience of the elastic pieces 14, the stator 6 is elastically retained between the projections 17 and the shoulder 21. The projecting strip 25 on the cylindrical wall 2 engages with the groove 27 in the stator core 7, thereby preventing the stator 6 from rotating relative to the cylindrical wall 2.

Figure 7:
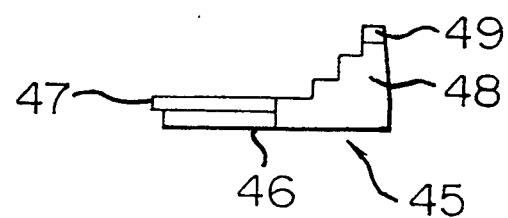
FIG. 7 is a side view showing a cover member of the fan motor shown in FIG. 1.
Figure 8:
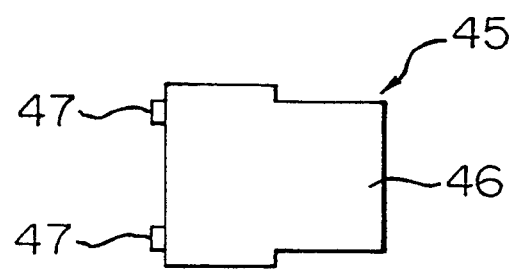
FIG. 8 is a front view off the cover member shown in FIG. 7.

The illustrated fan motor is provided with a cover member 45. Referring to FIGS. 6 through 10, a guide groove 43 is formed in the connecting portion 42 and used for leading the lead wires (not shown) from the circuit substrate 32. An opening 44 is formed in the portion of the motor body 53 to which the connecting portion 42 extends. It is used for soldering the lead wires to the substrate 32, and is covered with the cover member 45. As shown in FIGS. 7 and 8, the cover member 45 is composed of a body 46 shaped like a flat plate, a pair of pieces 47 extending from one end of the body 46, and legs 48 projecting from both sides of the body 46. A retaining click 49 is formed at the end of each leg 48. Both sides of the body 46 are formed into tapered portions 50. As shown in FIG. 6, a pair of through-holes 51 are formed in the connecting portion 42 of the housing 1.

Figure 9:
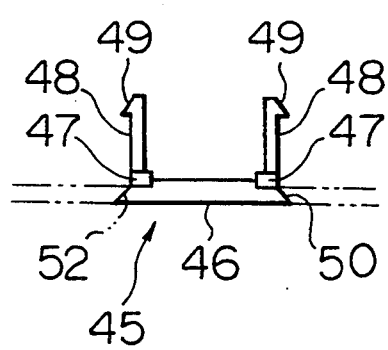
FIGS. 9 and 10 are each partial views showing the cover member placed.
Figure 10:
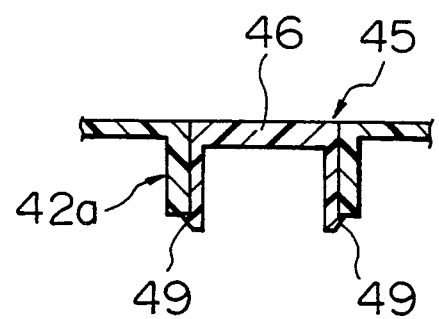

As illustrated in FIG. 6, when the opening 44 is covered with the cover member 45, the projecting pieces 47 are retained by the motor body 53. At the same time, the retaining clicks 49 at the ends of the legs 48 penetrate the through-holes 51 and project to the outside, as shown in FIG. 10. These clicks 49 are thereby retained on the undersurface of the connecting portion 42a. As depicted in FIG. 9, the tapered portions 50 of the cover member 45 come into contact with tapered portions 52 of the opening 44 so that the opening 44 is adjusted. As shown in FIG. 6, when the cover member 45 is placed, the undersurface of the motor body 53 becomes flush with the undersurface of the cover member 45.

As indicated by the imaginary line of FIG. 6, a metallic sheet 54 for shielding static electricity is affixed to the undersurface of the motor body 53.

Since the undersurface of the motor body 53 is flush with that of the cover member 45, the metallic sheet 54 can be easily affixed to the motor body 53 having the thus-constructed cover member 45. The metallic sheet 54 reliably shields static electricity generated by the fan motor. The cover member 45 not only prevents the lead wires from rising hue also reliably prevents that portion, where the lead wires are soldered to the substrate 32, from being electrically conducted.

Second Embodiment of Fan Motor

Figure 12:
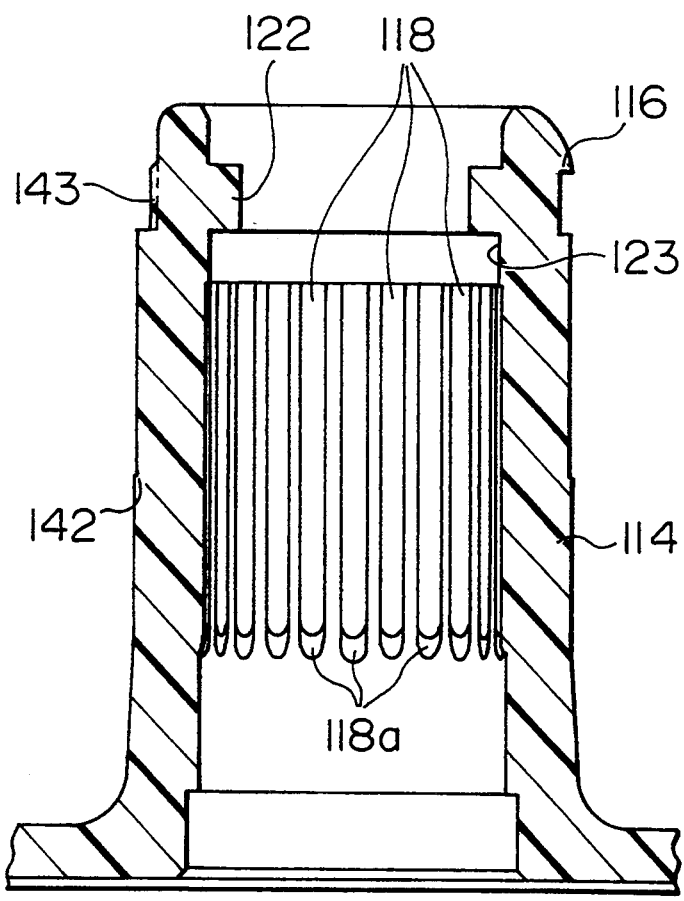
FIG. 12 is a sectional view showing the cylindrical wall of the fan motor illustrated in FIG. 11.
Figure 13:
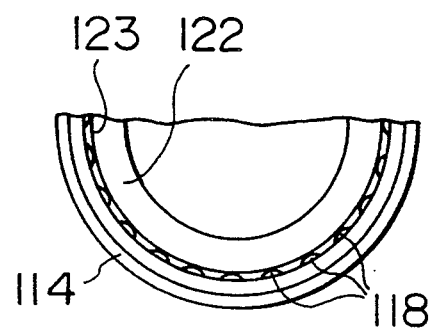
FIG. 13 is a partial plan view showing the cylindrical wall as viewed from above.

A second embodiment of a motor, such as a fan motor, in accordance with this invention will now be described with reference to FIGS. 11 through 13.

The illustrated fan rooter has a housing 110. A motor body 111 is disposed at the center of the housing 110 with the aid of a connecting portion 112. The motor body 111 is formed substantially like a basin with a cylindrical wall 114 at the center thereof. In this embodiment, the cylindrical wall 114, made of synthetic resin, is integrally formed with the housing 110, and extends vertically from the motor body 111. The outside diameter of the free (upper) end of the cylindrical wall 114 is smaller than other portions of the wall 114. A plurality of portions, for example, two, of the upper end of the cylindrical wall 114 are formed into projections 116. The smaller diameter portion of the cylindrical wall 114 and the projections 116 constitute a mating recess in the same manner as in the first embodiment.

Figure 11:
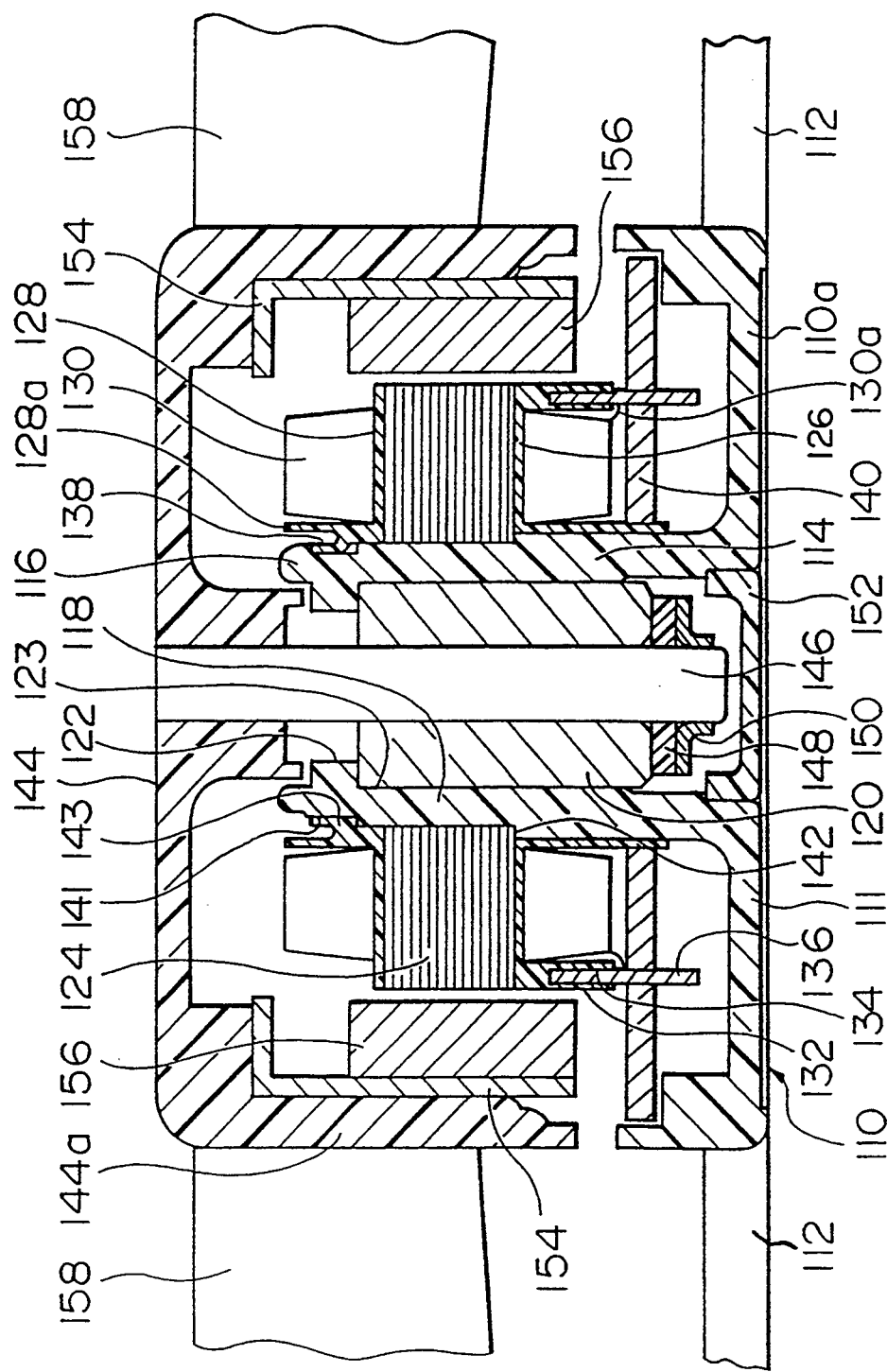
FIG. 11 is a sectional view showing a second embodiment of a motor, such as a fan motor, in accordance with this invention.

Twenty four strips 118 project at substantially equal intervals from the inner periphery of the cylindrical wall 114, and extend vertically as viewed in FIG. 11, that is, in the axial direction of the wall 114. An oil-containing bearing 20, such as a sleeve bearing, is inserted into the cylindrical wall 114 through an opening which is formed at one (lower) end of the wall 114 shown in FIG. 11. The bearing 20 is retained with the aid of the projecting strips 118. A positioning projection 122 is formed at the other (upper) end of the cylindrical wall 114 so as to extend inwardly. The undersurface of the positioning projection 122 is in contact with the upper surface of the oil-containing bearing 120. When the oil-containing bearing 120 is retained, each projecting strip 118 extends substantially along the whole length of the oil-containing bearing 120, except at the upper and lower ends. As can be seen from FIG. 11, the height of the cylindrical wall 114 where the projecting strips 118 extend correspond to the height of the same where a stator core 124 is attached. The inside diameter of an annular projection 123 between the positioning projection 122 and the projecting strips 118 is slightly smaller than the inside diameter of the cylindrical wall 114 where the strips 118 are formed. The annular projection 123 projects radially and inwardly. Because the projecting strips 118 are likely to deform, when the oil-containing bearing 120 is inserted into the cylindrical wall 114 from below as viewed in FIG. 11, the axis of the cylindrical wall 114 may incline with respect to the axis of the oil-containing bearing 120. However, because the annular projection 123 is located above the projecting strips 118, such an inclination can be corrected.

To facilitate the insertion of the oil-containing bearing 120 into the cylindrical wall 114, the lower end of each projecting strip 118 is tapered in the area where the oil-containing bearing 120 is inserted. The projecting strips 118 do not necessarily have the same shape, nor are they formed at equal intervals so long as they are uniformly formed on the inner periphery of the cylindrical wall 114.

The stator core 124 is attached to the outer periphery of the cylindrical wall 114. The upper and lower ends of the stator core 124 are covered with insulators 128 and 126, respectively. An armature coil 130 is wound around the stator core 124. Descending portions 132 are formed on the outer periphery of the insulator 126, and extend downwardly along the axis of the oil-containing bearing 120. Metallic pins 136 are inserted into openings 134 formed in the lower ends of the descending portions 132. Lead wires 130a extend from the coil 130 to the metallic pins 136 where they are soldered. The insulator 128 extending upwardly has a cylinder 128a which is formed into an annular elastic piece 138 having a "J" shape as seen in section.

A circuit substrate 140 is attached to the lower, outer periphery of the cylindrical wall 114 of the housing 110, and is placed over the bottom 110a of the motor body 111. The stator core 124 integral with the insulators 126 and 128 is attached from above to the intermediate, outer periphery of the cylindrical wall 114. Because of the stator core 124 retained by the outer periphery of the wall 114, inward pressure acts on the cylindrical wall 114. This inward pressure is not only dispersed by the projecting strips 118 on the inner periphery of the wall 114, but also absorbed by the elastic deformation of the strips 118, and then acts on the oil-containing bearing 120. It is therefore possible to prevent the oil-containing bearing 120 from deforming in the periphery thereof as much as possible. Since the inside diameter of the annular projection 123 is slightly smaller than the minimum inside diameter of the projecting strips 118, the outside diameter of that portion of the cylindrical wall 114, to which the annular projection is attached, increases slightly when the oil-containing bearing 20 is inserted. However, because the stator core 124 is not attached to that portion of the cylindrical wall 114, it is possible to avoid an adverse effect on the oil-containing bearing 120, such as one causing the precession of a bearing member 146. Pressure generated during the insertion of the stator core 124 may be further dispersed by reducing the intervals at which the projecting strips 118 are formed. The strips 118 may also project either from the outer periphery or from both inner and outer peripheries of the cylindrical wall 114.

The lower end of each pin 136 first penetrates the circuit substrate 140, and is then soldered to the terminal of the circuit substrate 140. The annular elastic piece 138 formed in the cylinder 128a of the insulator 128 is engaged with the making recess in the cylindrical wall 114. Such engagement prevents the stator core 124 integral with the insulators 126 and 128 from sliding upwardly and coming off from the cylindrical wall 114. A shoulder 142 of the cylindrical wall 114 is in contact with the inner, lower periphery of the stator core 124, whereby the stator core 124 is prevented from sliding downwardly. The shoulder 142 and the inner, lower periphery of the stator core 124 may be tapered in the same manner as in the first embodiment. Because of the curved lower end of the annular elastic piece 138 as shown in FIG. 11, it is easy to mate the stator core 124 with the cylindrical wall 114. This mating is carried out mainly with the aid of the deformation of the annular elastic piece 138. It is effective to prevent the stator core 124 from sliding upwardly and coming off from the cylindrical wall 114 since both the upper end of the annular elastic piece 138 and the undersurface of the projection 116, which is in contact with this upper end, are perpendicular to the axis of the bearing member 146. A plurality of grooves 141, for example, four, are formed in the inner periphery of the annular elastic piece 138, and extend in the axial direction of the bearing member 146. Projecting strips 143 for preventing rotation are formed on the portion of the outer periphery of the cylindrical wall 114, which portion correspond to the portion of the annular elastic piece 138 where the grooves 141 are formed. The projecting strips 143 engage with the grooves 141, whereby the stator core 124 is prevented from rotating relative to the cylindrical wall 114.

The bearing member 146 is rotatably supported by the oil-containing bearing 120. The cuplike rotor 144 is secured to the bearing member 146. A retaining ring 150 is fixed to the lower end of the bearing member 146, and a thrust plate 148 is interposed between the oil-containing bearing 120 and the retaining ring 150. Such a structure prevents the bearing member 146 from coming off from the oil-containing bearing 120. An opening at the lower end of the cylindrical wall 14 is covered with a sealing member 152 to close this opening in an airtight manner.

A yoke 154 is attached to the inner periphery of a peripheral wall 144a of the rotor 144. A cylindrical rotor magnet 156 is attached to the inner periphery of the yoke 154, and faces the stator core 124 with a space therebetween. Vanes 158 project from the outer periphery of the peripheral wall 144a of the rotor 144, thus constituting an impeller.

Circuitry for Protecting Motor

Figure 14:
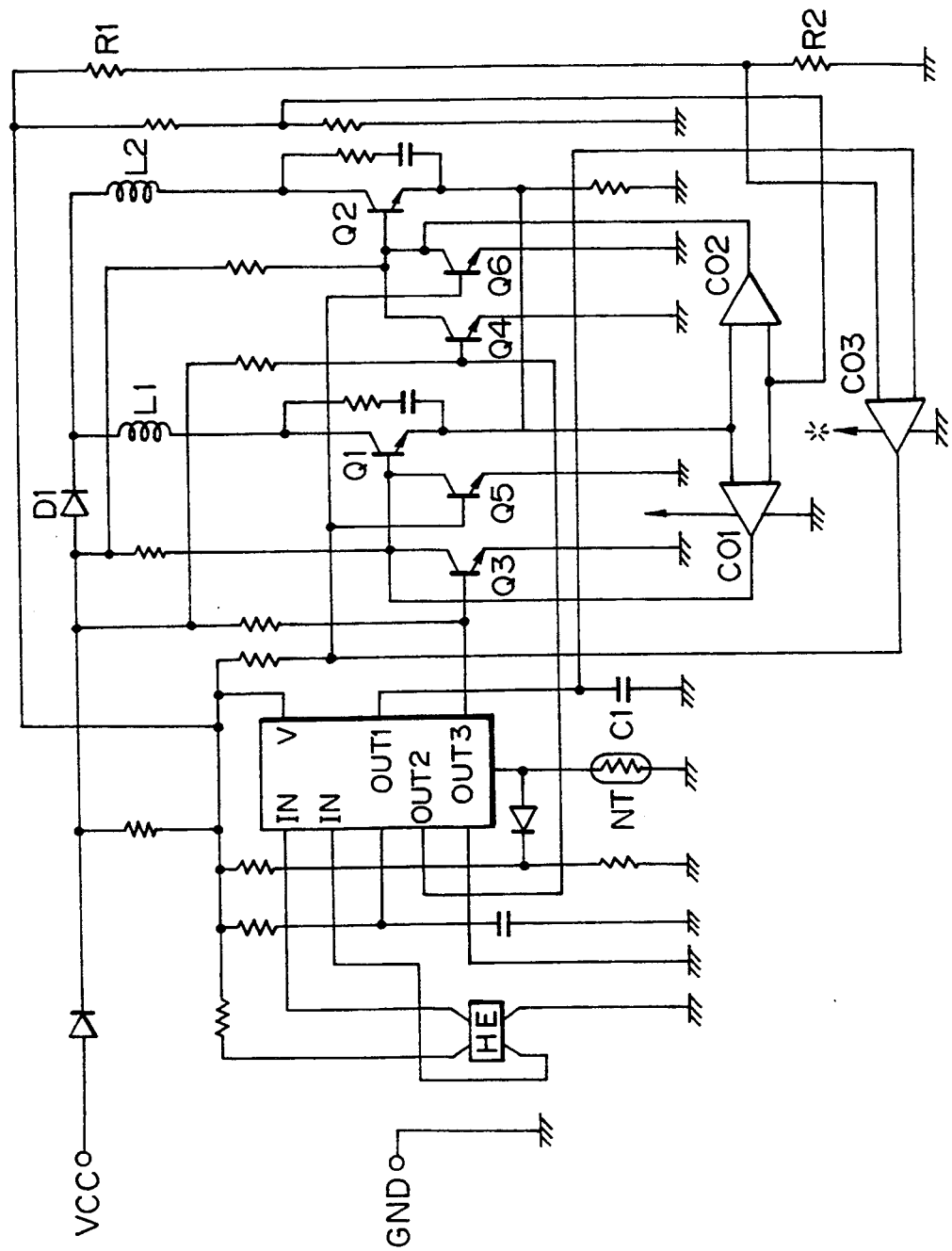
FIG. 14 is a circuit diagram showing a first embodiment of circuitry for protecting a motor in accordance with this invention.
Figure 15:
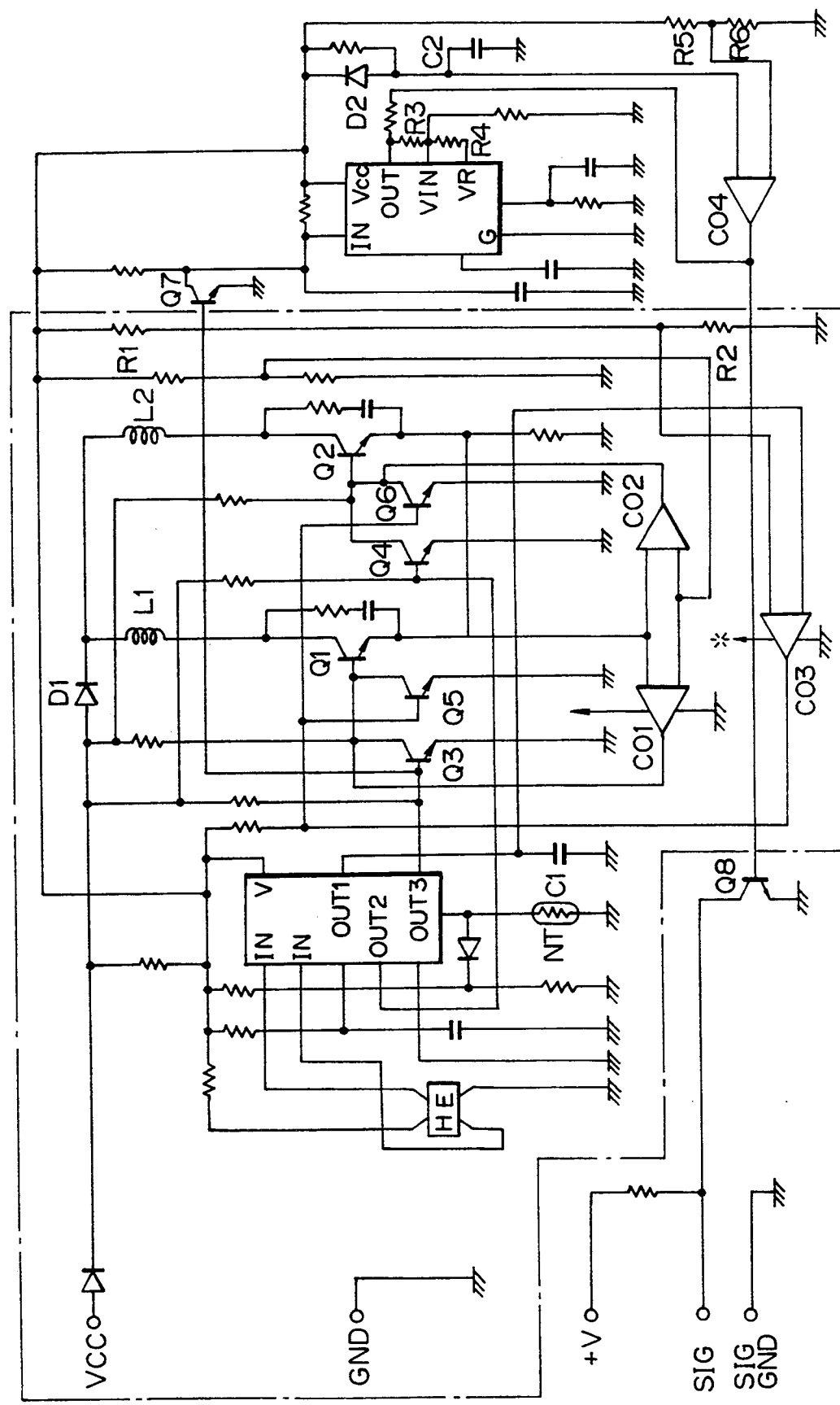
FIG. 15 is a circuit diagram showing a second embodiment of circuitry for protecting a motor in accordance with this invention.

The protective circuitry shown in FIGS. 14 and 15 may be suitably applied to the fan motors in accordance with the first and second embodiments described above.

FIG. 14 shows a motor driving circuit to which a first embodiment of protective circuitry is applied. The illustrated preventive circuitry comprises a thermistor NT, a semiconductor integrated circuit IC1, a hole element HE, switching transistors Q1 through Q6, comparators CO1 and CO2, a diode D for preventing reverse connection, resistors for adjusting voltage and preventing noise, capacitors, and other components. The thermistor NT detects temperature changes at the location where the motor is installed; the semiconductor integrated circuit IC1 is provided with a function for controllably operating a tyro-phase half wave; the hole element HE detects the strength of a magnetic field corresponding to the polarity of the fan motor; and the switching transistors Q1 through Q6 are used for supplying or not supplying an electric current to motor driving coils L1 and L2.

Two series resistors R1 and R2 form a circuit which stops the flow of the electric current to the motor driving coils L1 and L2 when the rotor is locked, and are connected to a power supply VCC in this preventive circuitry. The resistor R2 is grounded. The node between the resistors R1 and R2 is connected to the input terminal of the comparator CO3, which is a comparison circuit. A first voltage or reference voltage is applied to the comparator CO3 by setting the values of the resistors R1 and R2.

A capacitor C1 is connected to the output terminal OUT1 of the semiconductor integrated circuit IC1. The positive side of the capacitor C1 is connected to the input terminal of the comparator CO3, whereas the negative side is grounded. The capacitor C1 outputs a second voltage or charging voltage to the comparator CO3. While the motor is rotating normally, the capacitor C1 repeatedly performs a charge and discharge operation, and the charging voltage does not become higher than the reference voltage. If the rotor is locked, the capacitor C1 performs the discharge operation no longer, and the charging voltage increases more than the reference voltage.

The comparator CO3 outputs a low-level signal when the motor rotates normally and the charging voltage is lower than the reference voltage. It outputs a high-level signal when the rotator is locked and the charging voltage becomes higher than the reference voltage. This high-level signal serves as a rotation lock signal.

The output terminal of the comparator CO3 is connected to the bases of the switching transistors Q5 and Q6, which together constitute a circuit for stopping the flow of the electric current to the motor driving coils L1 and L2 when the rotor is locked. The collectors of the transistor Q5 and Q6 are connected to the bases of the switching transistors Q1 and Q2, which are in turn connected in series to the coils L1 and L2.

The operation of the above-described motor driving circuit will now be described. The thermistor NT detects a temperature change at the location where the fan is installed. A variation in voltage corresponding to the temperature change is input to the semiconductor integrated circuit IC1. A pulse voltage being applied to the motor driving coils L1 and L2 alters in accordance with the voltage variation. In this way, an electric current is supplied to the coils L1 and L2 for a period of time which corresponds to the width of the pulse. Thus, the number of rotations of the fan motor varies depending upon the ambient temperature. During the above operation, the capacitor C1 repeatedly performs the charge and discharge operation. The charging voltage applied to the comparator CO3 does not become higher than the reference voltage obtained by the resistors R1 and R2. Thus, the comparator CO3 outputs the low-level signal.

If the rotor is locked or stopped due to an object being caught between the vanes, the capacitor C1 ceases performing the discharge operation, and the charging voltage increases beyond the reference voltage. The comparator CO3 outputs the high-level signal, thus turning on the transistors Q5 and Q6, and then turns off the transistors Q1 and Q2. This breaks the circuit of the motor driving coils L1 and L2. In other words, if the rotor is locked, the electric current does not automatically flow to the coils L1 and L2, and therefore these coils are not heated.

If the rotor is locked and the transistors Q1 and Q2 are turned off, the power supply is turned off temporarily, and then the cause of the locked rotor is removed. The power supply is then turned off again, thus bringing the motor back to its normal operation.

It is desirable to add a circuit to the above-described embodiment, which detects abnormal rotation of the rotor when the voltage applied to the motor driving coils L1 and L2 decreases. The reason for this is that if abnormal rotation is detected whenever the above voltage decreases, a voltage decrease caused when the number of rotations of the rotor increases to a predetermined number after the motor has started may be detected as abnormal rotation. It is therefore preferable that an abnormality detecting circuit shown in FIG. 15 be provided so that the rotation of the rotor when the motor starts is not detected as abnormal rotation.

The circuitry shown in FIG. 15 will be described below. Components enclosed by the dot-and-dash line are the same as those of the circuitry shown in FIG. 14, and the explanation thereof is omitted. The circuitry shown in FIG. 15 is composed of components, such as resistors R3 and R4, a semiconductor integrated circuit IC2, other resistors R5 and R6, a capacitor C2, a comparator CO4, a transistor Q7 for switching a speed control signal, another transistor Q8 for switching a signal indicating abnormal rotation (hereinafter referred to as an abnormality signal), a rectifier diode D2, and resistors and capacitors for adjusting voltage and preventing noise. The resistors R3 and R4 output a predetermined reference voltage; the semiconductor integrated circuit IC2 has a built-in comparator which compares the reference voltage output from the resistors R3 and R4 with the voltage of the speed control signal; the resistors R5 and R6 output another reference voltage used for preventing the generation of the abnormality signal when the motor starts; the capacitor C2 generates an electric charge until a pulse voltage increases to the reference voltage output from the resistors R5 and R6. The comparator CO4 compares the charging voltage of the capacitor C2 with the reference voltage from the resistors R5 and R6.

The resistors R3 and R4 are connected in series. The node between these resistors is connected to an input terminal on the positive side of the comparator in the semiconductor integrated circuit IC2. The resistors R3 and R4 output the reference voltage, that is, a predetermined voltage, the occurrence of which corresponds to the occurrence of abnormal rotation of the rotor.

The semiconductor integrated circuit IC2 is provided with the comparator having a built-in frequency-to-voltage converting circuit. The converting circuit converts a speed control pulse signal transmitted from a speed control unit into voltage so as to compare this voltage with the reference voltage output from the resistors R3 and R4. If this voltage is higher than the reference voltage, the number of rotations of the rotor is detected as normal. If it is lower, the number of rotations is detected as abnormal, and the semiconductor integrated circuit IC2 outputs the abnormality signal.

The node between the resistors R5 and R6 is connected to the comparator CO4. The resistors R5 and R6 output another reference voltage, that is, a predetermined voltage used for preventing the generation of the abnormality signal when the motor starts. The capacitor C2 starts to generate an electric charge simultaneously with the starting of the fan, and continues to generate it until the pulse voltage reaches the reference voltage used for preventing the generation of the abnormality signal.

The comparator CO4 compares the charging voltage of the capacitor C2 with the above reference voltage, and outputs a signal which prevents the abnormality signal from being generated (hereinafter called a preventive signal) for a period of time during which the charging voltage increases to the reference voltage, that is, until the number of rotations of the fan increases to the predetermined number after the fan has started. The above output is based upon the comparison between the charging voltage and the reference voltage.

In the circuitry described above, when the pulse voltage decreases and abnormal rotation is detected, the speed control signal, input to a signal input terminal IN of the semiconductor integrated circuit IC2, is converted into voltage. This voltage is compared with the reference voltage input from the resistors R3 and R4 to a reference voltage terminal VIN of the semiconductor integrated circuit IC2. If the voltage of the speed control signal is less than the reference voltage, abnormal rotation of the fan is detected, and then the abnormality signal is output to control equipment attached to the fan.

It is also possible to prevent the generation of the abnormality signal by causing the capacitor C2 to perform the charge operation until the number of rotations of the fan increases to the predetermined number after the fan has started, that is, until the pulse voltage applied to the motor driving coils L2 and L2 increases to the reference voltage. For instance, the comparator CO4 outputs the preventive signal for a period of time during which the capacitor C2 performs the charge operation until the pulse voltage increases to the reference voltage output from the resistors R5 and R6. The above output of the preventive signal prevents the abnormality signal from being transmitted to the outside. In other words, the semiconductor integrated circuit IC2 detects abnormality because the pulse voltage is less than the reference voltage, by which condition the rotation of the fan is detected as abnormal. However, even when such a condition is satisfied, the comparator CO4 forcibly outputs the preventive signal for a period of time during which the capacitor C2 performs the charge operation, this period of time corresponding to the period of time during which the number of rotations of the fan increases to the predetermined number. In this way, the semiconductor integrated circuit IC2 is prevented from determining abnormality. Thus, the abnormality signal is not output to the outside.

When the pulse voltage applied to the motor driving coils L1 and L2 is more than the reference voltage, that is, when the fan is rotating normally, the semiconductor integrated circuit IC2 detects such rotation as normal, and does not output the abnormality signal.

Although the above-described embodiments have been applied to cooling fans used for devices such as personal computers, this invention is not limited to such devices, as it may also be applied to fans used for other electronic control devices. This invention may equally be applied to types of motors other than fan motors.

What is claimed is:

1. A motor comprising:
   a housing;
   a stator attached to an outer periphery of a cylindrical wall of said housing;
   a sleeve bearing attached to an inner periphery of the cylindrical wall of said housing;
   a bearing member rotatably supported by said sleeve bearing;
   a rotor secured to said bearing member;
   a rotor magnet attached to said rotor and facing said stator; and
   a plurality of projecting strips formed substantially at equal intervals on the inner and/or outer periphery of the cylindrical wall of said housing for attaching said sleeve bearing to the cylindrical wall, said cylindrical wall having an opening at one end of the cylindrical wall of said housing for inserting said sleeve bearing into said opening;
   a positioning projection formed on the inner periphery of the cylindrical wall at the other end of the cylindrical wall for retaining said sleeve bearing in position; and
   an annular projection formed on a portion of the inner periphery of the cylindrical wall, said portion being near said positioning projection formed on the cylindrical wall of said housing, said annular projection extending radially and inwardly more than said plurality of projecting strips.

2. A motor according to claim 1, wherein said plurality of projecting strips are formed on a portion of the inner periphery of the cylindrical wall, which portion corresponds to a portion of the cylindrical wall to which said stator is attached.

3. A motor according to claim 1, wherein the amount one end of each of said plurality of projecting strips projects increases progressively, radially and outwardly in the direction in which said sleeve bearing is inserted.

4. A motor comprising:
a housing;
a stator attached to an outer periphery of a cylindrical wall of said housing;
a sleeve bearing attached to an inner periphery of the cylindrical wall of said housing;
a bearing member rotatably supported by said sleeve bearing;
a rotor secured to said bearing member;
a rotor magnet attached to said rotor and facing said stator; and
a plurality of projecting strips formed substantially at equal intervals on the inner and/or outer periphery of the cylindrical wall of said housing;
a shoulder formed on the outer periphery of the cylindrical wall of said housing for retaining said stator in position, said shoulder being tapered radially in the direction in which said stator is attached;
a mating recess formed at a free end of the cylindrical wall; and
an insulator disposed on one end of said stator core so as to cover said stator core, said insulator having elastic pieces to be engaged with said mating recess for elastically retaining said stator core between said shoulder and said mating recess.

5. A motor according to claim 4, wherein projecting strips for preventing rotation are formed on the outer periphery of the cylindrical wall of said housing, said projecting strips extending in the direction in which said stator is attached, grooves being formed in said stator so as to correspond to said projecting strips, and wherein when said stator is attached in a predetermined manner, said projecting strips engage with said grooves, whereby said stator is prevented from rotating relative to said housing.

6. A motor comprising:
a housing having a cylindrical wall;
a stator having a stator core attached to an outer periphery of the cylindrical wall;
an armature coil wound around said stator core;
a bearing member rotatably supported by the cylindrical wall with the aid of bearing means;
a rotor secured to said bearing member;
a rotor magnet attached to said rotor and facing said stator core;
a shoulder formed on the outer periphery of the cylindrical wall of said housing for retaining said stator in position, said shoulder being tapered radially in the direction in which said stator is attached;
a mating recess formed at a free end of the cylindrical wall;
an insulator disposed on one end of said stator core so as to cover said stator core, said insulator having elastic pieces to be engaged with said mating recess for elastically retaining said stator core between said shoulder and said mating recess.

7. A motor according to claim 6, wherein projecting strips for preventing rotation are formed on the outer periphery of the cylindrical wall of said housing, said projecting strips extending in the direction in which said stator is attached, grooves being formed in said stator so as to correspond to said projecting strips, and wherein when said stator is attached in a predetermined manner, said projecting strips engage with said grooves, whereby said stator is prevented from rotating relative to said housing.

* * * * *

UNITED STATES PATENT AND TRADEMARK OFFICE
CERTIFICATE OF CORRECTION

PATENT NO.  : 5,363,003
DATED       : November 8, 1994
INVENTOR(S) : Morikawa et al.

It is certified that error appears in the above-identified patent and that said Letters Patent is hereby corrected as shown below:

TITLE PAGE, ITEM [75]:

Delete "Koji Harada; Takashi Hirata: Fumihiro Morikawa; and Shuji Takahashi" and substitute--Fumihiro Morikawa and Shuji Takahashi--.

Signed and Sealed this

Twenty-first Day of March, 1995

Attest:

BRUCE LEHMAN

*Attesting Officer*        *Commissioner of Patents and Trademarks*